Figure 1:
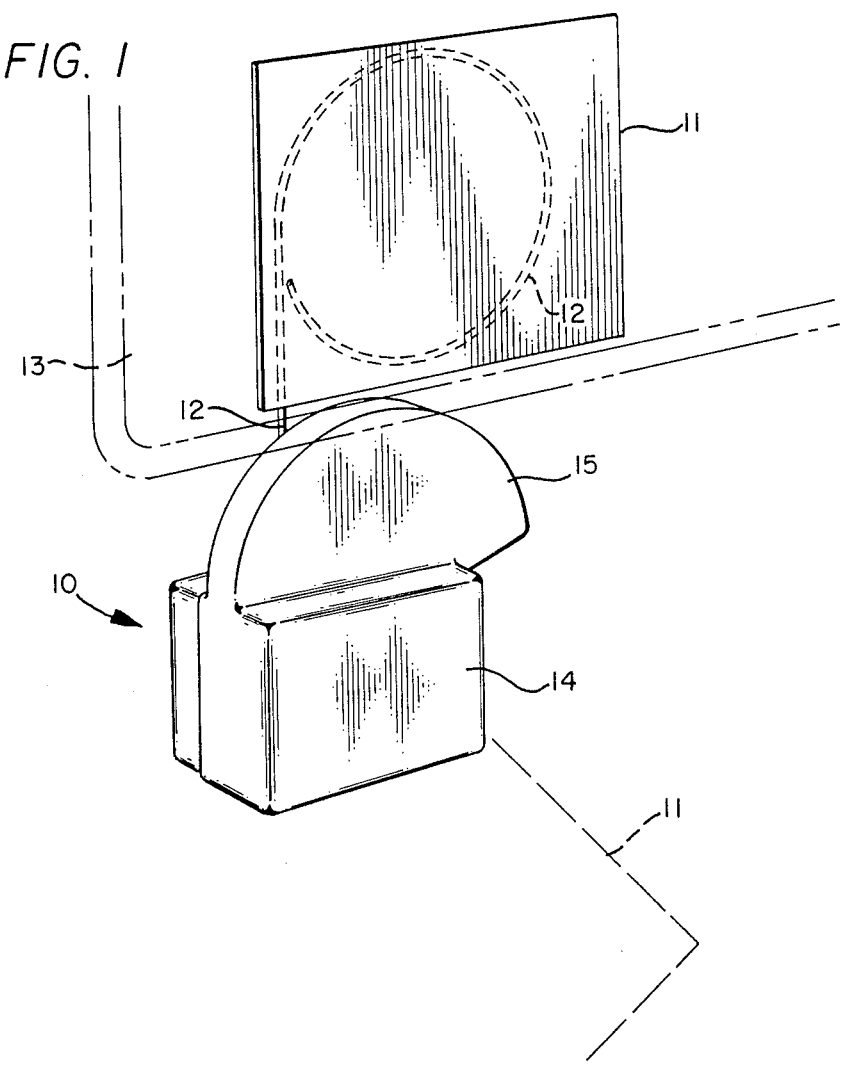

United States Patent [19]

Hoang

[11] Patent Number: 4,871,995
[45] Date of Patent: Oct. 3, 1989

[54] VEHICLE REAR WINDOW BRAKE APPLICATION ACTIVATED SIGN RAISER

[76] Inventor: Dat T. Hoang, 915 Spring Valley Pl., #110, Richardson, Tex. 75080

[21] Appl. No.: 133,892

[22] Filed: Dec. 16, 1987

[51] Int. Cl.$^4$ .............................................. B60Q 1/26
[52] U.S. Cl. ..................................... 340/487; 116/43; 116/303
[58] Field of Search ................ 340/71, 127, 130, 132, 340/138, 142; 116/46, 57, 52, 41, 42, 43, 35, 46, 284, 303

[56] References Cited

U.S. PATENT DOCUMENTS

| | | | |
|---|---|---|---|
| 1,212,363 | 1/1917 | Killian | 116/52 |
| 1,328,245 | 1/1920 | Liebler | 340/132 |
| 1,704,595 | 3/1929 | Edwards | 340/130 |
| 2,939,108 | 5/1960 | McIntire | 340/127 |
| 3,863,214 | 1/1975 | Kerr, Jr. | 340/130 |

Primary Examiner—Joseph A. Orsino
Assistant Examiner—Jeffery A. Hofsass
Attorney, Agent, or Firm—Warren H. Kintzinger

[57] ABSTRACT

An electric power driven sign raiser mounted inside a vehicle bvelow and inside a rear window. The unit is electrically conneced to be activated when the brake light come on with actuation of the brakes. Upon actuation an electromagnet and an electric motor are energized with the electric motor driving a sign lever up to the raised state with the sign showing through the rear window to a position where a switch is thrown cutting off power to the electric motor. The electromagnet holds the sign in the raised position for following drivers to see through the rear window and then when the vehicle brake pedal is released the electromagnet is de-energized and the sign falls back down to its lowered out of sight state ready for reactivation raising with the next application of the vehicle brakes.

10 Claims, 2 Drawing Sheets

U.S. Patent    Oct. 3, 1989    Sheet 1 of 2    4,871,995

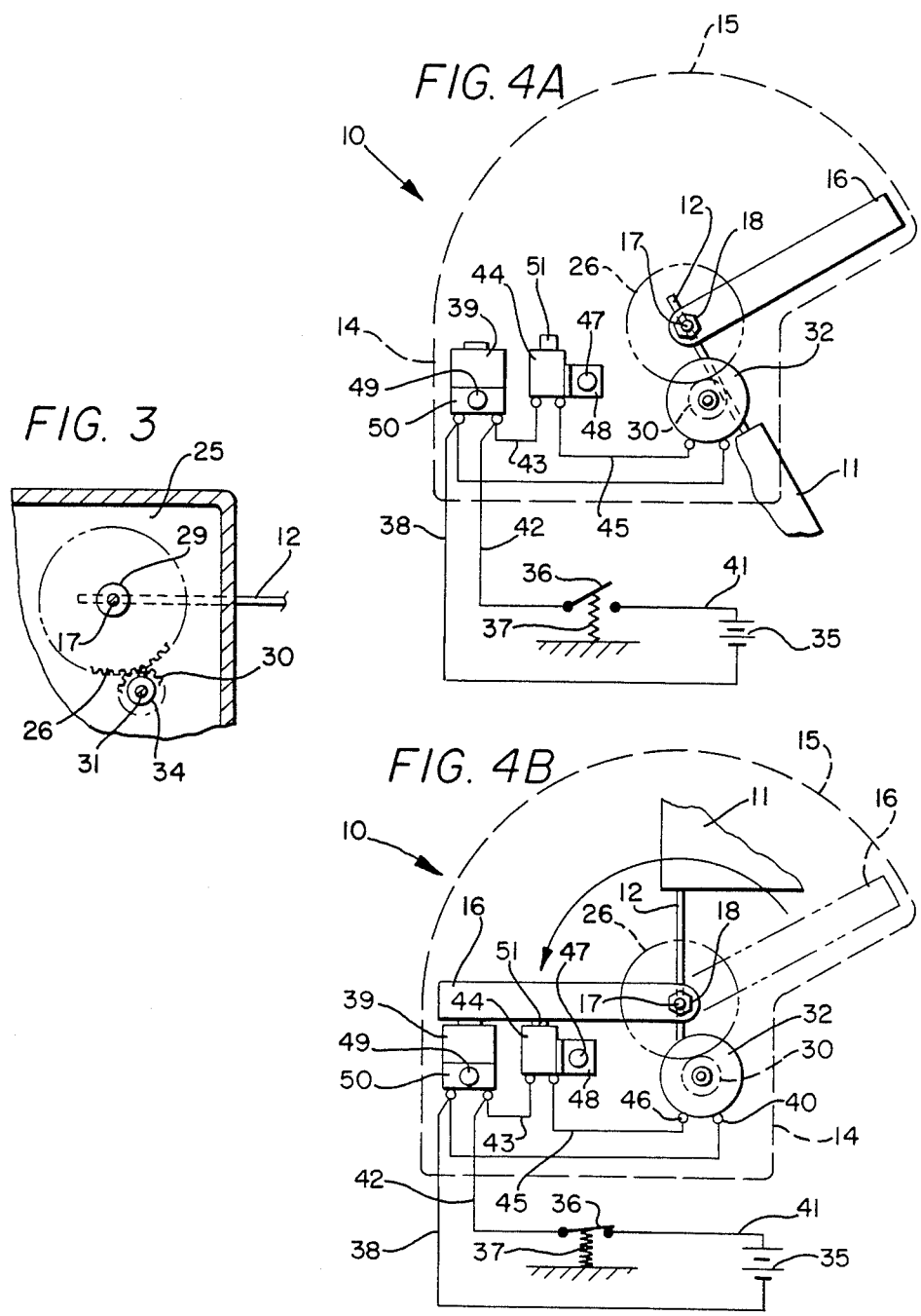

VEHICLE REAR WINDOW BRAKE APPLICATION ACTIVATED SIGN RAISER

This invention relates in general to vehicle carried brake stopping warning systems, and more particularly, to a vehicle rear window brake application activated sign raiser.

With the application of vehicle brakes the turn on of brake lights alone does not always motivate a following driver to quickly apply his vehicle brakes and there are more rear end collisions than there should be. Many times the boredom of driving dulls a person's senses and they do not respond reaction wise as they should. At times an additional input will enable a person to more quickly become aware and react more quickly. A vehicle rear window located brake application activated sign raiser that raises an alerting sign from a hidden position to full view through the rear window upon application of the brakes would in many instances be that additional input that makes the difference attention wise for timely reaction response on the part of the following driver.

It is therefor a principal object of this invention to provide an additional brake warning in a vehicle visable through the rear window to a following motorist upon brake application in the lead vehicle.

Another object is to provide such a warning that remains visable only through the duration of time vehicle brakes are applied.

A further object is to provide such a warning device that is other than merely a stop light.

Still another object is to provide such a warning device that includes a sign physically moved into view through a vehicle rear window when the brakes are applied and that drops out of sight when the brakes are released.

Features of the invention useful in accomplishing the above objects include, in a vehicle rear window appearing brake application activated sign raiser, an electric power driven sign raiser inside a vehicle below and inside a rear window. The unit is electrically connected to be activated when the brake lights come on with actuation of the brakes. Upon actuation an electromagnet and an electric motor are energized with the electric motor driving a sign lever up to the raised state with the sign showing through the rear window to a position where a switch is thrown cutting off power to the electric motor. The electromagnet holds the sign in the raised position for following drivers to see through the rear window and then when the vehicle brake pedal is released the electromagnet is de-energized and the sign falls back down to its lowered out of sight state ready for reactivation raising with the next application of the vehicle brakes.

A specific embodiment representing what is presently regarded as the best mode of carrying out the invention is illustrated in the accompanying drawings.

Figure 2:
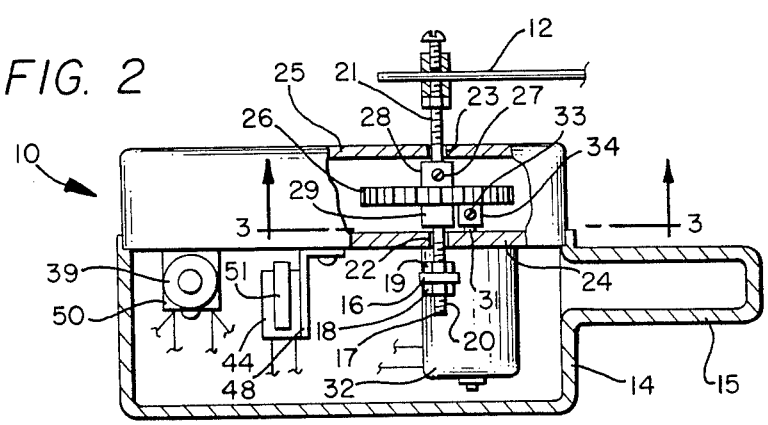

In the drawings:

FIG. 1 represents a perspective view of a vehicle rear window appearing brake application activated sign raiser positioned inside and below the rear window of a vehicle;

FIG. 2, a top partially cut away and sectioned plan view of the sign raiser device of FIG. 1;

FIG. 3, a partial broken away and sectioned view showing magnetic iron arm and sign rod gear drive detail;

FIG. 4A, a part diagramatic and circuit schematic showing of the device in the deactivated non-braking state with the sign in the lowered state; and FIG. 4B, a part diagramatic and schematic showing like FIG. 4A with, however, the device in the activated braking state with the sign fully raised.

Referring to the drawings:

The sign raising device 10 of FIGS. 1-4B raises and lowers a sign 11 with a center of gravity to one side from the sign carrying and mounting rod 12 that can be bent over and around in a circle or oblong like shape as a sign stiffener and support. As shown in FIG. 1 the sign raising device 10 is located inside a vehicle and below the vehicle rear window 13 such that when braking activated the sign 11 is raised into full view in the window and upon deactivation with release of the brakes the sign 11 is permitted to fall by gravity to the lowered out of sight position. With this structure and operational action the sign raising device 10 is useful in vehicles having room therefore between the back of a seat and the back of the vehicle interior below a rear window such as encountered with many pickup trucks and some other vehicles. The sign raising device 10 is shown to be so located and to have a rectangular case 14 with a semi-circular housing projection 15 at the top within which an elongate iron bar 16 is rotatable through a limited range of actuate movement about its mounting on threaded shaft 17. The iron bar 16 is fixed in position on shaft 17 by nuts 18 and 19 on opposite sides thereof tightened together on shaft threads 20 with the iron bar 16 at the desired angle. This is such that when the device is deactivated the sign 11 falls to its lowered state since the center of gravity (CG) thereof is displaced to one side of its rod 12 mounting on shaft extension 21 that is part of shaft 17 that extends through openings 22 and 23 in case walls 24 and 25, respectively, for bearing support. Shaft 17 also extends through spur gear 26 that is fixed on shaft 17 as by set screw 27 in hub extension 28. A spacer 29 on shaft 17 aids in maintaining shaft 17 and spur gear 26 in proper alignment in case 24 and in meshed engagement with spur gear 30 that is mounted on the output shaft 31 of drive motor 32 by a set screw 33 in gear hub extension 34. The drive motor 32 is a DC electric motor driven by vehicle battery 35 power as by connection to the vehicle braking wire circuit system including a normally biased to open switch 36. This is indicated in FIGS. 4A and 4B with switch 36 including a spring 37 biasing the switch to the open state such as shown in FIG. 4A however when the brakes are applied the switch is moved to the m closed state.

The negative side of battery 35 is connected through line 38 to electromagnet 39 and on to the motor terminal 40 while the positive side of battery 35 is connected through line 41 to switch 36 the other side of which is connected through line 42 to electromagnet 39 and on through line 43 to switch 44 the other side of which is connected through line 45 to motor terminal 46. Switch 44 that is normally in the closed state for through flow of current is so positioned on wall 24 by mounting screw 47 through flange 48 to be in alignment with electromagnet 39 mounted on wall 24 by mounting screw 49 through flange 50. This alignment is such that the iron bar 16 engages and deflects the arm 51 of switch 44 to open the switch as the iron bar 16 is magnetically drawn to electromagnet 39 that holds this state and thereby the sign 11 elevated for viewing through window 13 until DC power to electromagnet 39 is cut off with brake release upon which the sign 11 falls by its own weight to the down retracted state. When the brake pedal is again depressed motor 32 is again driven to raise the sign 11 and turn iron bar 16 to the up limit position with bar 16 engagement with electromagnet 39 and switch 44 opened.

Whereas this invention has been described with a single embodiment thereof, it should be realized that various changes may be made without departing from the essential contributions to the art made by the teaching hereof.

I claim:

1. An electric power driven sign raiser mountable inside and below a vehicle window that when energized drives the sign up for showing through the rear window comprising: a sign with mounting rod means pivotally mounted in a pivot mount means with said sign with mounting rod means having a center of gravity to one side from the pivotal mount axis of rotation of said sign with mounting rod means so that when the sign is released from its raised state it falls back down to its lowered out of sight state; electric power drive means connected for driving said sign with mounting rod means pivotally from a lowered out of sight state up to a raised state with the sign showing through the rear window of a vehicle; electric circuit means connected to said electric power drive means connectable to electric power source means; and actuation switch means in said electric circuit means for activation driving of said electric power drive means and for power disconnect deactivation of said electric power drive means; also including an electromagnet in said electric circuit means; ferromagnetic bar means mounted for rotation with said sign with mounting rod means about the pivotal mounting thereof and rotation into engagement with said electromagnet when said sign with mounting rod means reaches the fully raised state; said electric circuit means having a first circuit section, and a second extension circuit section; said first circuit section connectable to said electric power source means, and including said actuating switch means and said electromagnet; and said second extension circuit section including a second switch positioned to be engaged and switched to the open state by sign raiser means with said second switch cutting current flow to said electric power drive means as said sign with mounting rod means reaches the fully raised state; and wherein said ferromagnetic bar means is separate from said mounting rod means.

2. The electric power driven sign raiser of claim 1, wherein with said first circuit section connected to a vehicle battery and with said actuating switch means opening with brake release thereby cutting current flow to said electromagnet de-energizing the electromagnet and said ferromagnetic bar means is released from electromagnetic attraction to the electromagnet and the sign with mounting rod means along with said ferromagnetic bar means is permitted to rotate with falling of the sign back down to its lowered out of sight state.

3. The electric power driven sign raiser of claim 2, wherein said pivot mount means includes, a shaft that extends through openings in spaced walls of a holding structure for bearing support.

4. The electric power driven sign raiser of claim 3, wherein said electric power driven means includes a direct current drive motor.

5. The electric power driven sign raiser of claim 4, wherein said direct current drive motor is mounted on a wall of said spaced walls with a motor output shaft parallel to and spaced from said shaft of said pivot mount means.

6. The electric power driven sign raiser of claim 5, wherein spur gear drive means interconnect said motor output shaft and the shaft of said pivot mount means.

7. The electric power drive sign raiser of claim 6, wherein a spur gear is mounted on said motor output shaft and a spur gear is mounted on the shaft of said pivot mount means.

8. The electric power driven sign raiser of claim 7, wherein said direct current motor is mounted on a side of one of said spaced walls remote from the other wall of said spaced walls.

9. The electric power driven sign raiser of claim 7, wherein said spur gear drive means is mounted between said spaced walls.

10. The electric power driven sign raiser of claim 9, wherein said mounting rod means is non-rotatably fixed to an end of said shaft of the pivot mount means outside of one of said spaced walls and said ferromagnetic bar means is fixed to the other end of said shaft of the pivot mount means outside of the other wall of said spaced walls.

* * * * *